United States Patent
Cole et al.

(10) Patent No.: US 6,345,314 B1
(45) Date of Patent: Feb. 5, 2002

(54) TECHNIQUE TO MINIMIZE DATA TRANSFER BETWEEN TWO COMPUTERS

(75) Inventors: Gary Lee Cole, Endicott, NY (US); Richard Kenneth McGuire, Brackney, PA (US); Steven Michael Pritko, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/548,990

(22) Filed: Oct. 27, 1995

(51) Int. Cl.$^7$ ............................................... G06F 9/54
(52) U.S. Cl. ...................................................... 709/316
(58) Field of Search ................................ 395/680, 681, 395/683; 709/310–332

(56) References Cited

U.S. PATENT DOCUMENTS

| | | | |
|---|---|---|---|
| 4,937,681 A | | 6/1990 | Fujinawa et al. ............ 358/426 |
| 5,276,898 A | * | 1/1994 | Kiel et al. .................... 709/105 |
| 5,555,427 A | | 9/1996 | Aoe et al. .................... 709/201 |

OTHER PUBLICATIONS

Nascimento et al., "Behavior maintenance of migrating objects in a distributed object–oriented environment," Journal of Object–Oriented Programming, Sep. 1992, pp. 25–33.*

Barton et al., "Evolving to Objects — The Witches' Brew," ACM, 1995, pp. 414–425.*

PKZIP, The next generation in compression software, Shareware Manual, PKWARE, pp. 57–67, Dec. 1993.*

SOMobjects Developer Toolkit Users Guide, Version 2.0, 6–1–6–71, Jun. 1993.*

* cited by examiner

*Primary Examiner*—St. John Courtenay, III
(74) *Attorney, Agent, or Firm*—Arthur J. Samodovitz

(57) ABSTRACT

A host computer provides an object stored in the host computer to a target computer. In response to a need for an object at the target computer, the host computer generates and transfers to the target computer a proxy program instead of the object. The proxy program, when executed at the target computer, provides the object. Usually, the proxy program is much shorter than the object itself, and this reduces message traffic. The proxy program has various forms such as a call to another program resident in the target computer to recreate the object or a request to a function within the target computer to provide the object. The host computer can also be programmed into an object oriented environment, the object referencing other objects, and the proxy program forming an agent in the target computer which requests these other objects from the host computer only as needed by the target computer.

27 Claims, 6 Drawing Sheets

TECHNIQUE TO MINIMIZE DATA TRANSFER BETWEEN TWO COMPUTERS

BACKGROUND OF THE INVENTION

The invention relates generally to computer systems, and deals more particularly with a technique to minimize data transfer between two computers or between a single computer and an external storage device.

It is well known today that one computer may serve as a host (or "server") and manage a large memory and nonvolatile storage for data and stored programs that another, client computer may need. The client computer may request such data or programs on its own initiative or the host may initiate the transfer itself. In some cases, the data and program to be transferred are very large and will "tie-up" the communication facility for an extended period of time. This may delay other important transfers or simply be very costly. In general, it is desirable to minimize the amount of data transfer.

Often the data is scattered throughout storage in the host computer (before transfer) and pointers are used to identify which blocks belong to the same data set. When such data needs to be transferred to a client computer, the data is first collected into a buffer and the pointers are replaced by offsets into the buffer. This simplifies the data transfer by permitting a bulk transfer. Nevertheless, this does not significantly reduce the total amount of data to be transferred.

Some computer systems today are "object oriented", i.e. each unit of data or stored program is encapsulated with respective management functions or "object methods" to manage or operate upon the data or stored program, and the combination is considered a discrete "object".

Each object also belongs to a class with other objects. Each class also includes one or more object methods which can perform a function associated with any object in the class. Thus, all objects in the class share the object methods of the class. When called, an object can either invoke its own method (if one exists) to handle the request or use a shared class method to handle the request.

Also, an object typically references one or more other objects. For example, if an object contains shared data, then other objects which share this data reference this object. Also, a directory object may reference all file objects listed in the directory, and a text object may reference another object which indicates the length of the text object.

One type of request made to an object is to obtain a copy of the object. In response to such a copy request, a copy object method, either within the object itself or from the class, copies the object into a buffer and identifies the other objects which it references. Then, the copy method calls other copy methods within the referenced objects to copy the referenced objects into the buffer and replace the RAM pointers of the referencing object with offset(s) of the referenced object(s) in the buffer. This process is called "flattening" the object set, and provides a more efficient package for transferring the object set across the communication facility. Nevertheless, if the object set is large, there is a substantial burden on the communication facility.

Accordingly, a general object of the present invention is to minimize the amount of data transfer in object oriented and nonobject oriented environments.

SUMMARY OF THE INVENTION

The invention resides in a host computer for providing an object stored in the host computer to a target computer. In response to a need for an object at the target computer, the host computer generates and transfers to the target computer a proxy program instead of the object. The proxy program, when executed at the target computer, provides the object. Usually, the proxy program is much shorter than the object itself, and this reduces message traffic.

According to one feature of the invention, the proxy program comprises a call to another program resident in the target computer to recreate the object.

According to another feature of the invention, the object also resides in the target computer, and the proxy program comprises a request to a function within the target computer to provide the object.

According to another feature of the invention, the host computer is programmed into an object oriented environment, the object references other objects, and the proxy program forms an agent in the target computer which requests these other objects from the host computer as needed by the target computer.

According to another feature of the invention, the host computer comprises a template for the proxy program and, in response to the need, enters data into the template to form the proxy program.

According to another feature of the present invention, the object stored in the host computer is in a form which is incompatible with target computer, and the proxy program converts the object to a form usable by the target computer.

DETAILED DESCRIPTION OF THE PREFERRED EMBODIMENTS

Figure 1A:
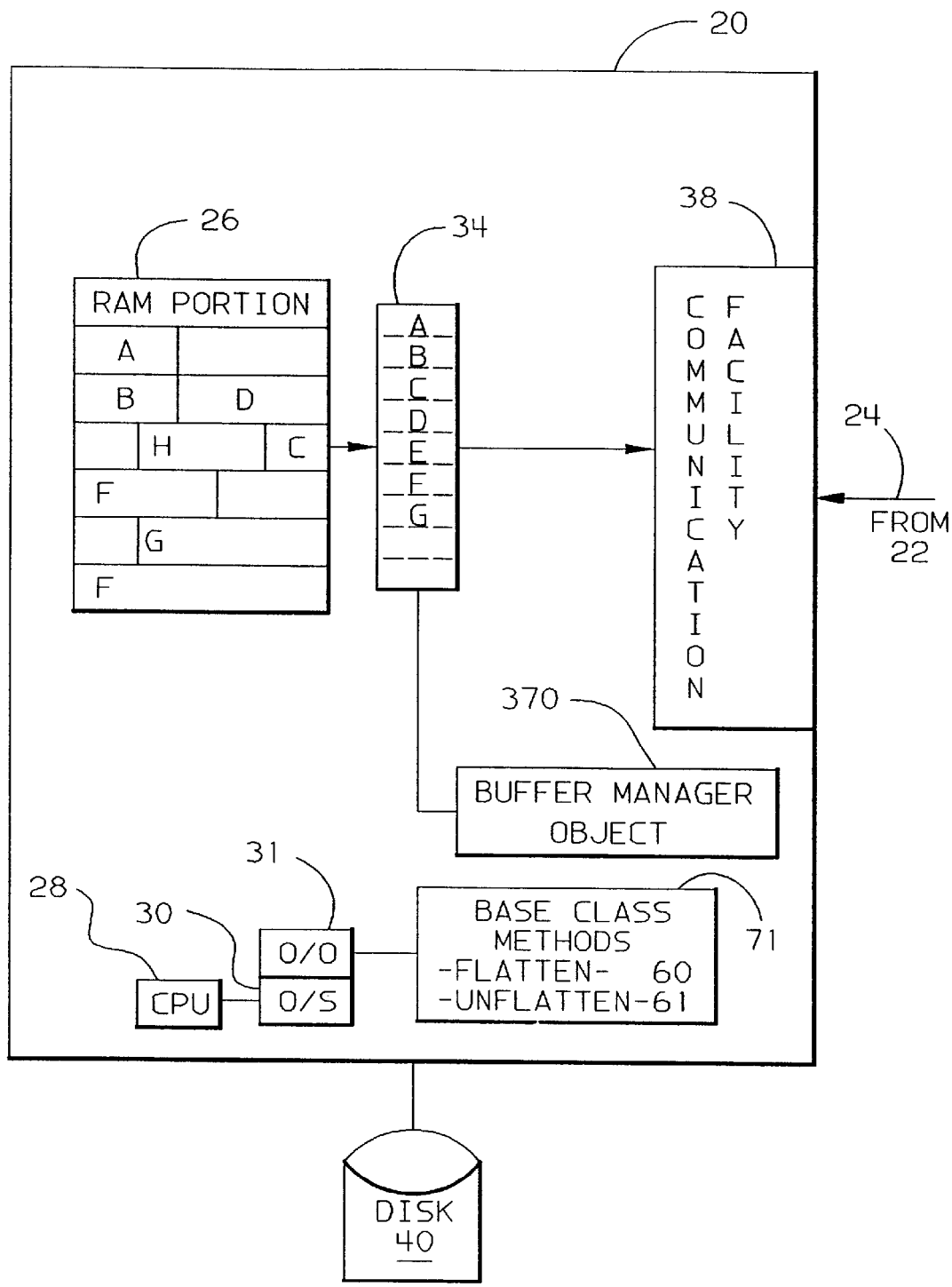
FIG. 1 is a block diagram of a host computer and a client or target computer according to the present invention.
Figure 1:
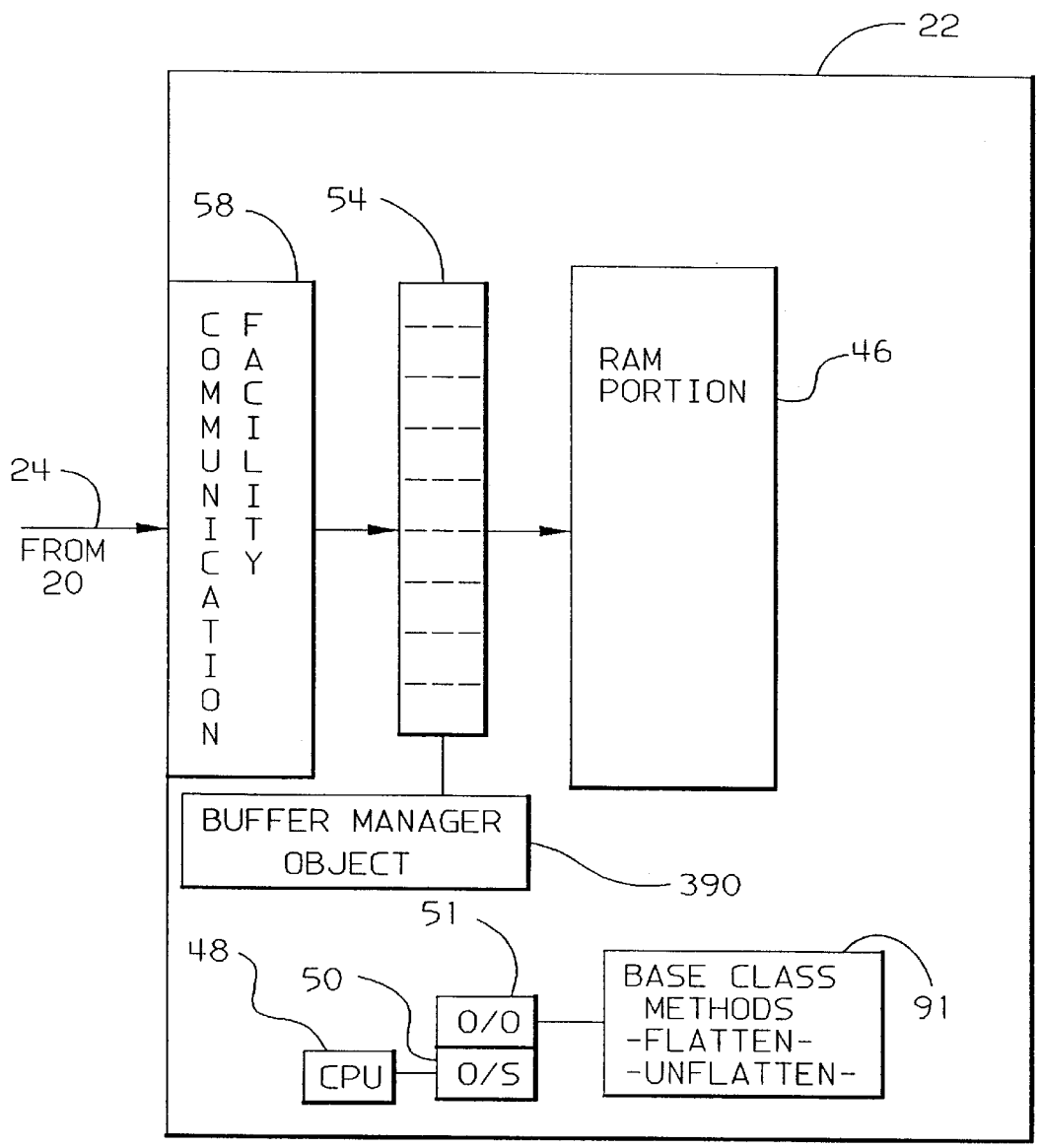

Referring now to the drawings in detail wherein like reference numbers indicate like elements throughout, FIG. 1 illustrates a host computer 20 and a client or target computer 22 according to the present invention. Computers 20 and 22 are interconnected by a communication medium 24 (for example, a transmission line or satellite). Computer 20 comprises a RAM portion 26, CPU 28, an operating system 30, buffer 34, communication facility 38 and external disk storage 40. Computer 22 likewise comprises a RAM portion 46, CPU 48, an operating system 50, buffer 54 and communication facility 58. Computers 20 and 22 may be personal computers, work stations, main frame computers or other types of computer.

In the illustrated embodiment, computers 20 and 22 include programs 31 and 51, respectively, to implement an object oriented (OO) environment. By way of example, programs 31 and 51 are IBM Object REXX programs which are further described in "The Developer Connection for OS/2" which is available from International Business Machines Corporation at Mechanicsburg, Pa. by order #P30H2320. Object oriented programs 31 and 51 control execution of various object methods within objects A-G stored in RAM portion 26 and later stored in RAM portion 46. Object oriented programs 31 and 51 also control execution of various object methods in classes 71 and 91 containing objects A-G in computers 20 and 22, respectively.

Figure 2:
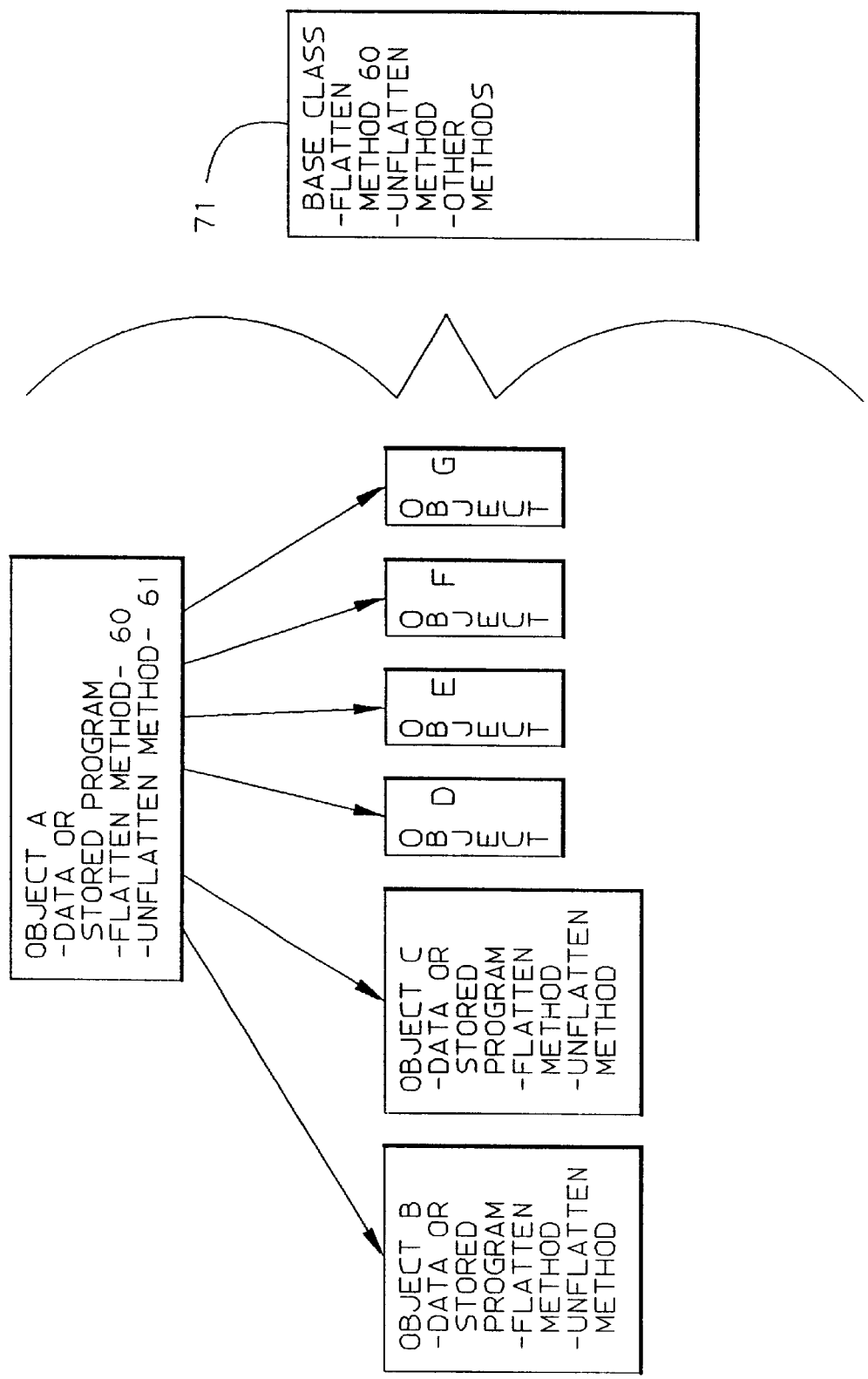
FIG. 2 illustrates an object set and an associated class within the host computer of FIG. 1.

In the example illustrated in FIG. 1, objects A-G are stored in random and discontiguous locations in RAM portion 26. As illustrated in FIG. 2, object A references objects B-G, i.e. includes address pointers to objects B-G. (While the illustrated example does not include any objects referenced by objects B-G, this could have been the case.) Collectively, object A, all objects referenced by object A, all objects referenced by the objects referenced by object A, etc. are called an "object set". Thus, in the example illustrated in FIG. 2, the object set comprises objects A-G. Object A includes an address pointer to each of the objects B-G to indicate their locations in RAM 26. (If objects B-G referenced other objects, then each of the objects B-G would likewise include address pointer(s) to the object(s) it references and these additional objects would also be considered part of the same data set.)

According to the present invention, there are two alternate techniques to satisfy a need by computer 22 for an object or object set stored in computer 20 (either pursuant to a request by computer 22 or pursuant to a determination in computer 20). According to one technique (which is similar to the prior art), the object or object set is flattened into buffer 38 (i.e. copied into buffer 34 with the RAM address pointers of its references changed to buffer offsets), the flattened object or object set is transferred to computer 22 and then the object or object set is unflattened in computer 22 and stored in RAM portion 46 for use in computer 22. However, alternately a "proxy" (which is usually much shorter than the corresponding actual object itself) may be sent from computer 20 to computer 22, instead of all or some of the respective object. In general, the proxy comprises programming and data/parameters to (a) recreate the object in computer 22, (b) create an updated object in computer 22 without sending the bulk of the object stored in the host computer, (c) modify the object stored in computer 20 to a form compatible with computer 22 while transferring the object as well, (d) locate the object within computer 22 itself, or (e) create an agent within computer 22 to request from computer 20 the object if actually needed by computer 22 (bearing in mind that in the prior art, a request for a single object elicits the entire set whereas only some of the objects in the object set may actually be needed in computer 22).

In the example illustrated in FIG. 2, objects A-G are all part of the same class. Class 71 includes a flatten object method 60 and an unflatten object method 61 which are the "default" flatten and unflatten object methods when a flatten or unflatten request is made to any object within the class and the object does not override the default with its own flatten or unflatten object method. Flatten object method 60 is similar to the prior art where the object is moved into the buffer and the RAM address pointer is changed to a buffer offset. The corresponding unflatten method in target computer 22 (which is similar to unflatten method 61) participates in the relocation of the object into RAM portion 46 in the target computer and change from buffer offsets to address pointers. Object A utilizes the flatten and unflatten object methods 60 and 61 whereas objects B-G utilize their own respective flatten and unflatten object methods.

The flatten and unflatten object methods for objects B-G are much different than the default flatten and unflatten object methods 60 and 61. The flatten object methods for objects B-G result in a proxy (program) instead of the actual object being copied into the buffer 34 and then transferred to computer 22. The unflatten object methods for objects B-G result in relocating the proxies into RAM portion 46 and changing the buffer offsets to address pointers in RAM portio 46. The types of proxies are further described below in reference to FIG. 3.

Figure 3:
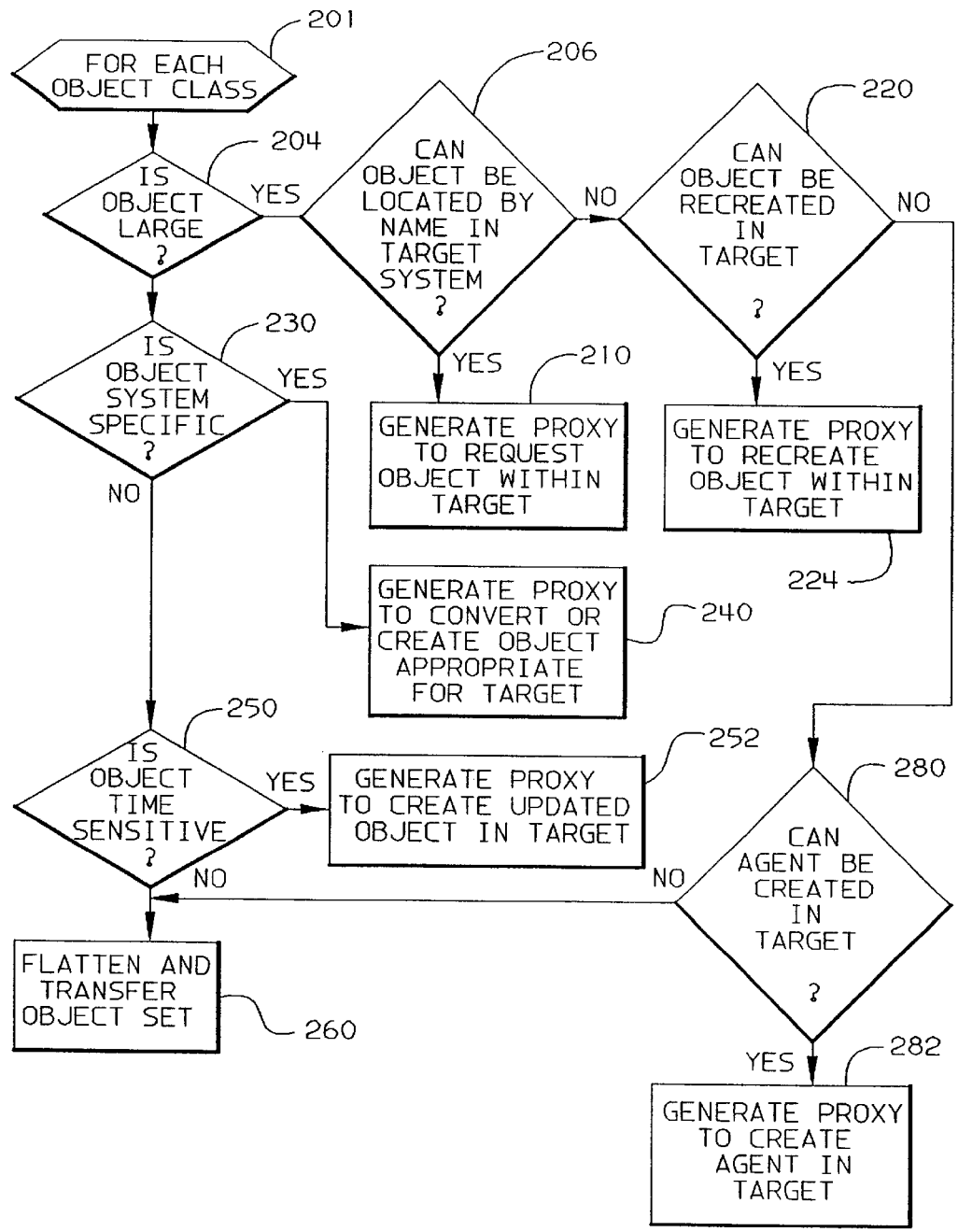
FIG. 3 is a flow chart of an algorithm used by a programmer during formation of an appropriate "flatten" object method within each object or a class associated with the object to determine whether the object itself or a proxy should be transferred upon request for a copy of the object.

FIG. 3 is a flow chart of an algorithm used by a programmer/implementor during formation of "flatten" object methods within respective objects A-G to determine whether the object itself or a proxy should be transferred upon request, and if a proxy, the nature of the proxy. For each of the objects beginning with object A, the programmer compares the size of the object to a predetermined threshold (decision 204). If the object is larger than the threshold, then the programmer determines if object A will be located within computer 22 when needed by a function within computer 22 (but not known by the function to reside in computer 22) (decision 206). If so, then a short proxy program will be sent to computer 22, instead of the actual object A. The proxy program, when executed within computer 22, will request an object method 84 to locate the desired object set within computer 22 (step 210). The programmer generates the proxy program required by step 210 by inserting the name of object A into a template. Pseudocode for the proxy program required by step 210 is indicated below with the template within brackets and descriptive comments within /* */ for a case where the programmer knows with certainty that the object will be stored in computer 22:

File System Object Method for Flatten
name=myself
   /*Lookup does a System Lookup for*/
   /*The object with the specified Name*/
   /*We know this object does exist on*/
   /*the target system, with this name*/
   /*So no need to check for existence.*/
[return lookup(<name>)]

Pseudocode for another proxy program is indicated below with the template within brackets and descriptive comments within /* */. for a case where the programmer does not know with certainty whether the object will be stored in computer 22:

name=lookup (myself)
originsystem=location of system where flatten takes place
   /*Lookup does a System Lookup for*/
   /*The object with the specified Name*/
   /*We don't know if this object exists*/
   /*on the target system, with this*/
   /*name. So need to check for*/
   /*existence.*/
   /*If it doesn't exist then issue*/
   /*a request back to origin system for*/
   /*the object*/
[object=lookup(<name>)
   if found Then
     return object
     else
     return requestObjectFrom(<originSystem>,<name>)
]

Referring again to decision 206, if the programmer determines that the object will not exist within computer 22 at the time of the need or could not be located by name, then the programmer determines if the object can be recreated within computer 22 by additional programming (decision 220). This determination is based on the characteristics 6f computer 22 and the subject object. For example, a lookup table resulting from execution of a function which exists in both computers 20 and 22 can be recreated in computer 22 by calling the function in computer 22. If the object can be recreated within computer 22, then a proxy program will be transferred to computer 22 instead of the actual object to recreate the object (step 224). It should be noted that typically the proxy program 224 utilizes pre-existing programs already in computer 22 to generate the object, and comprises calls to these pre-existing programs and other data/parameters that will be needed by these pre-existing programs to recreate the object. However, if necessary, a self contained proxy program can be transferred to computer 22 to recreate the object without use of pre-existing programs in computer 22. The programmer generates the proxy program required by step 224 by inserting the name of object A into a template. Pseudocode for this proxy program is indicated below with the template within brackets and descriptive comments within back slashes:

System Configuration Object Method for Flatten
    /*SystemConfig( ) is a function which*/
    /*returns a large amount of system*/
    /*information which is stored within*/
    /*a system configuration object*/
    /*ConfigObject is a class from which a system configuration object can be built using the new function and passing system configuration parameters*/
(return new(configObject,systemConfig( ))]

Referring again to decision 220, if the object cannot be recreated in computer 22, then the programmer determines if a proxy agent program can be installed in computer 22 to access the function of the object without moving the object (decision 280). This determination is based on the ability to communicate with the object as needed. If the agent program can be installed in computer 22 to arrange for the object (if actually needed) then the programmer generates the proxy agent program and transfers the proxy agent program to computer 22 for installation there. The agent program, when executed within computer 22, will respond to subsequent requests from functions within computer 22 for the respective object by requesting services from the object on computer 20 (step 282). The programmer generates the proxy program required by step 282 by inserting the name of object A and location of computer 20 into a template. Pseudocode for the proxy program 282 is indicated below with the template within brackets and descriptive comments within /* */:
name=this Objects Name
originsystem=location of system where flatten takes place
[return agentProxy(<name>,<originSystem>)
]
  NOTE: code template for agentproxy
    arguments=methodName, array_of_arguments
    /* Lookup Method, determines whether or*/
    /* not the agentproxy understands/knows*/
    /* about the method requests (methodName)*/
      [if lookupMethod(methodName)=found
        /* Method name is known locally, run it*/
      run(methodName, array_of_arguments)
      else
        /* Method isn't known locally, so forward*/
        /* The message to the original object on*/
        /* the original system.*/
      return forward_message(methodName, array_of_arguments, <name>,<originSystem>)
]

Referring again to decision 280, if such an agent program cannot be established in computer 22, then the object method 60 will flatten the object and transfer the flattened object to computer 22 as described in more detail below in reference to FIG. 4 (step 260).

Referring again to decision 204, even if the size of the object is not larger than the threshold, there still may be reasons to transfer a proxy instead of the actual flattened object. Accordingly, the programmer determines if the type or form of object is specific and limited to computer 20, and not usable by computer 22 (decision 230). For example, the object type defines a communication path or "socket" within computer 20 that is not usable outside of computer 20. In this example, a proxy program and any necessary data or parameters are transferred to recreate the socket object within computer 22 in a form and type usable by computer 22 (step 240). The programmer generates the proxy program required by step 240 by inserting the location of computer 22 and current state of the socket into a template. Pseudocode for the proxy program required by step 240 is indicated below with the template within brackets, descriptive comments within /* */ and substitute parameters enclosed in < >:
Socket Object Method for Flatten
remoteSys=location of the remote system
socketState=current state of the socket (open, closed, . . . )
    /*If the current state of the socket*/
    /*is open. Then codeProxy will*/
    /*also open the socket connection*/
[socket=new socket(<remoteSys>)
  setState(socket, <socketState>)
  return socket
]

As another example of a proxy program required by step 240, computer 20 supports ASCII characters whereas computer 22 supports EBCDIC. In this example, the entire object along with a proxy program to convert from ASCII characters to the EBCDIC characters is transferred. The programmer generates the proxy program in this example by inserting the object character string into a template. Pseudocode for the proxy program 240 is indicated below with the template within brackets and descriptive comments within /* */:
string =systemDependant Character Data
    /* Character Representation on this System
    (EBCDIC or ASCII)*/
sysCharType=system_CharacterType( )
    /* If this systems characters are EBCDIC*/
    /* code on target system should check for*/
    /* system Character type and if different*/
    /* need to convert the string.*/
    /* If the current system EBCDIC*/
If sysCharType=EBCDIC Then
    [If system_CharacterType( )=ASCII
      newString=convertToASCII(<string>)
      return newString
      Else
    return <string>
    ]

Referring again to decision 230, even if the object type or form is usable and supported by computer 22, a proxy should be sent if the data within the object, such as a stock quote, is stale (decision 250). If so, then the programmer generates the proxy program required by step 252 by inserting the list of stocks into a template. Pseudocode for the proxy program is indicated below with the template within brackets and descriptive comments within back slashes:

[stocknames=list of stocks
number_items–number–items (<stocknames>)
for i=1 to items
stock values (i)=get_stock_price (<stockname>,i)
return stock value]

Referring again to decision 250, if the data within the object is not time sensitive (and not larger than the threshold—decision 204 and not system specific—decision 230), then the flattened object should be transferred as described below in FIG. 4 (step 260).

Figure 4:
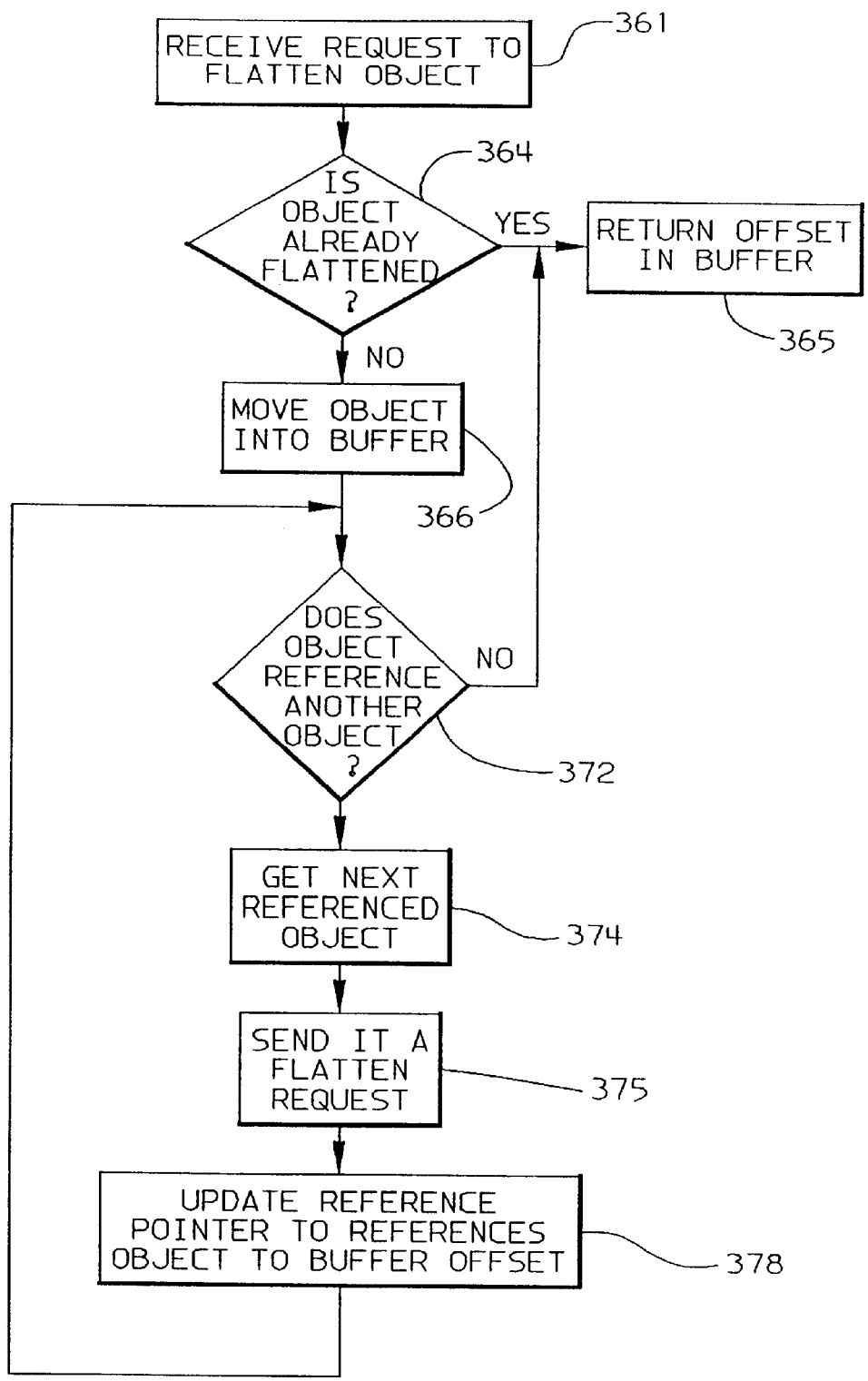
FIG. 4 is a flow chart of a prior art, flatten object method within a class which encompasses all of the objects illustrated in FIG. 2.

FIG. 4 is a flow chart illustrating in more detail the flatten object method 60 for object A. Method 60 is programmed into object A in response to the algorithm of FIG. 3 yielding step 260. Method 60 begins with receipt of a request to flatten object A (step 361). In response, the flatten object method 60 for object A determines if object A is already flattened (decision 364) and if so, returns the offset of object A in buffer 34 (step 365). However, if object A has not yet been flattened, object method 60 moves object A into buffer 34 under control of buffer manager object 370 (step 366). Next, object method 60 determines if object A references another object and thereby identifies objects B-G in the illustrated example (decision 372 and step 374). Next, object method 60 sends one of the referenced objects a flatten request (step 375), and then updates the reference pointer to this object to indicate its new beginning offset in buffer 34 (step 378). Next, object method 60 repeats steps 372–378 for each of the remaining objects referenced by object A.

Figure 5:
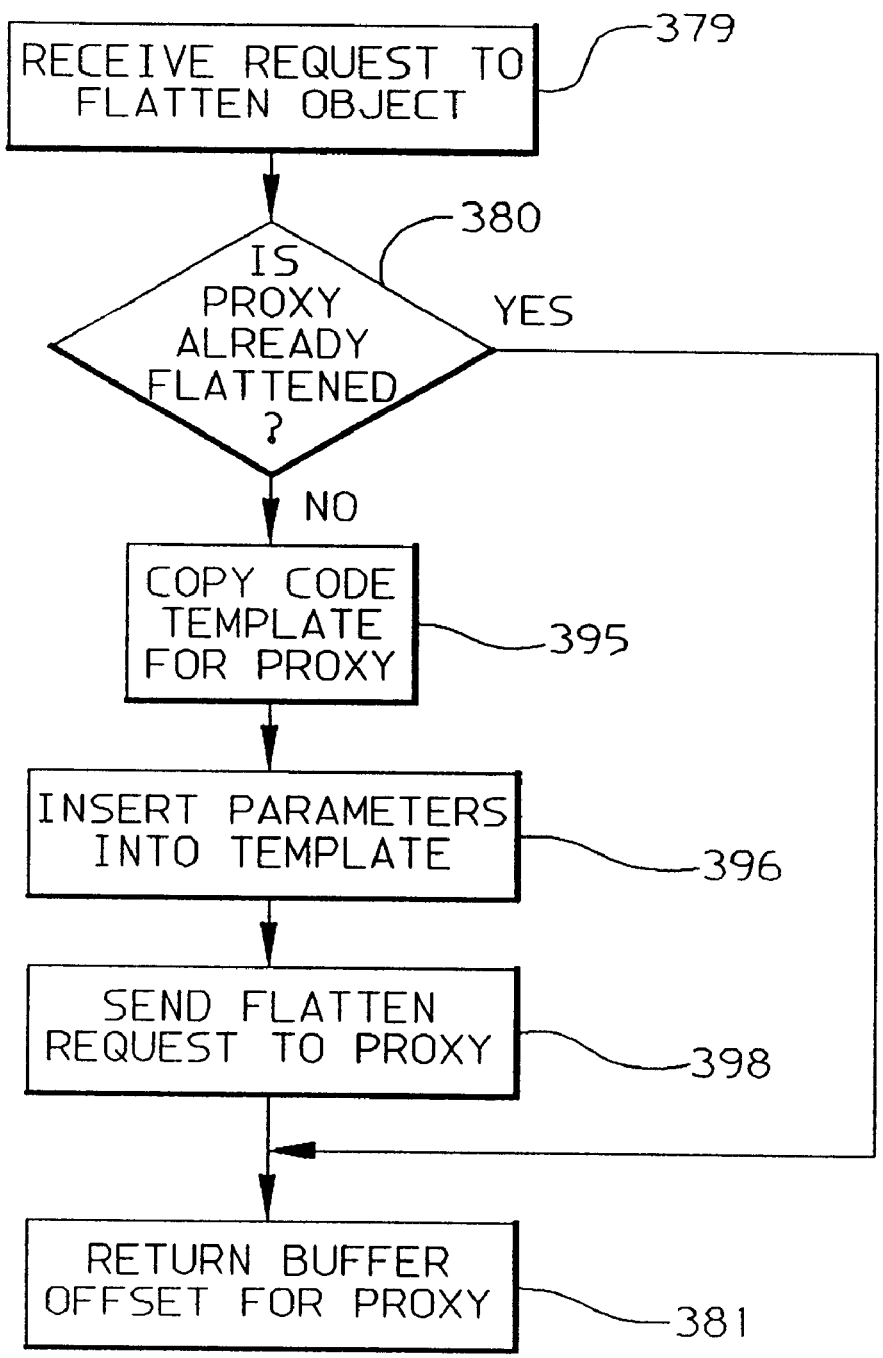
FIG. 5 is a flow chart of a flatten object method within each of the objects B-G illustrated in FIG. 2.

FIG. 5 illustrates in more detail the process implemented by each of the objects B-G in response to the flatten request of step 375. The respective flatten object method receives the respective request (step 379). Next, the flatten object method for each of the objects B-G determines if the proxy has already been generated for the respective object and stored in buffer 34 (decision 380). If so, then the flatten object method returns the offset of the proxy in the buffer (step 381). However, if not, the flatten object method for the respective object B-G proceeds to make a copy of the template previously programmed into the object method (step 395). Next, the flatten object method generates the complete proxy program object by filling in the necessary data/parameters into the copy of the template program (step 396). Next, the flatten object method for the object B-G sends the flatten request to the proxy program object, and the proxy program object moves itself into the buffer and returns its offset into the buffer (step 381).

Steps 379–398 are performed for each of the objects B-G, and after the last of these objects is moved into buffer 34 and the appropriate offset entered into object A in buffer 34, the "flattening" process is complete. Next, the composite object set (comprising flattened object A and proxies for objects B-G) is transferred over communication line 24 to computer 22 and received into buffer 54. In computer 22, the object oriented program 51 writes the buffer contents into RAM 46 and sends an unflatten message to the buffer object 390. The buffer object then sends the unflatten message to the flattened version of object A. In the illustrated example, the unflatten method for object A will change the buffer relative pointers it contains to real pointers according to the actual location of the objects in RAM portion 46 in computer 22. Object A will then send the unflatten message to each of its referenced objects. In the illustrated example, objects B-G are represented by proxies. When proxy objects B-G receive their respective unflatten message, the proxy object executes the proxy code it contains yielding an object that is functionally equivalent to the object for which the proxy was created.

Based on the foregoing, computer systems according to the present invention have been disclosed. However, numerous modifications and substitutions can be made without deviating from the scope of the present invention. For example, if it is desirable to store an object in external storage, computer 20 can store a proxy program as described above instead of the object or flattened object to minimize the amount of storage needed. Moreover, as noted above, a proxy can be sent instead of actual data or a stored program in nonobject oriented environments. In such a case, the same criterion as described in FIG. 3 are used to determine whether to send the actual data or proxy (where in the nonobject oriented environments, the term "object" in FIG. 3 means the data or stored program), i.e. size of data (decision 204), availability of data in target computer (decision 206), feasibility of recreating data in target computer (decision 220), feasibility of creating an agent program in target computer (decision 280), whether data is system specific (decision 230) and whether data is stale (decision 250). Therefore the invention has been disclosed by way of illustration and not limitation and reference should be made to the following claims to determine the scope of the present invention.

What is claimed is:

1. A host computer for assisting a target computer obtain an object, said host computer comprising:

means for storing said object and a proxy program in said host computer, said proxy program when executed at said target computer generating said object at said target computer; and means, responsive to a need for said object at said target computer, for transferring said proxy program to said target computer, said proxy program being transferred from said host computer to said target computer instead of any substantive form of said object even though said object is stored in said host computer.

2. A host computer as set forth in claim 1 wherein said proxy program comprises a call to another program resident in said target computer to generate said object.

3. A host computer as set forth in claim 1 wherein said object comprises data, said data being larger than said proxy program.

4. A host computer as set forth in claim 1 further comprising means for storing a template and, in response to said need, entering a name of said object into said template to form said proxy program.

5. A host computer as set forth in claim 1 further comprising means for establishing an object oriented environment in said host computer; and wherein said object references other objects; and said proxy program, when executed in said target computer, generates in said target computer said other objects as well as the first said object.

6. A host computer as set forth in claim 1 wherein the transferring means also includes means for transferring said object to said target computer instead of said proxy program, said transferring means transferring said object instead of said proxy program if a length of said object is less than a threshold and transferring said proxy program instead of said object if said length of said object is greater than a threshold.

7. A host computer as set forth in claim 1 wherein said host computer receives a request from said target computer for said object to indicate said need for said object.

8. A host computer for assisting a target computer obtain an object, said host computer comprising:

means for storing said object and a proxy program in said host computer, said proxy program, when executed at said target computer, requests said object from within said target computer; and means, responsive to a request for said object by said target computer, for determining that said target computer already has a copy of said object and transferring said proxy program to said target computer, said proxy program being transferred from said host computer to said target computer instead of any substantive form of said object even though said object is stored in said host computer.

9. A host computer as set forth in claim 8 wherein said proxy program comprises a call to another program resident in said target computer to fetch said object.

10. A host computer as set forth in claim 8 wherein said object comprises data, said data being larger than said proxy program.

11. A host computer as set forth in claim 6 further comprising means for storing a template for said proxy program and, in response to said need, entering a name of said object into said template to form said proxy program.

12. A host computer as set forth in claim 8 further comprising means for transferring said object to said target computer.

13. A host computer as set forth in claim 8 further comprising means for establishing an object oriented environment in said host computer; and wherein said object references other objects; and said proxy program, when executed in said target computer, requests said other objects as well as the first said object from said target computer.

14. A host computer for providing a target computer with a first object and other objects, said host computer comprising:

means for storing said first object, said other object and a proxy program in said host computer, said first object referencing said other objects, said proxy program, when executed at said target computer, forming an agent which requests said other object from said host computer as needed by said target computer; and means, responsive to a request by said target computer for said first object, for transferring said first object and said proxy program to said target computer.

15. A host computer as set forth in claim 14 wherein said first object comprises data.

16. A host computer as set forth in claim 14 further comprising means for storing a template for said proxy program and, in response to said need, entering a name of said other objects and a location or identification of said host computer into said template to form said proxy program.

17. A host computer as set forth in claim 1 further comprising means for establishing an object oriented environment in said host computer.

18. A host computer for providing a target computer with an object in a first alphanumeric character form usable by said target computer, said host computer comprising:

means for storing said object in a second alphanumeric character form in said host computer, said object in said second form being usable by said host computer but not said target computer;

means for storing a proxy program that, when executed at said target computer, converts said object in said second form to said first form; and means, responsive to a need by said target computer for said object in said first form, for transferring said object in said second form and said proxy program to said target computer.

19. A host computer as set forth in claim 18 wherein said object comprises data.

20. A host computer as set forth in claim 18 further comprising means for storing a template for said proxy program and, in response to said need, entering data into said template to form said proxy program.

21. A host computer as set forth in claim 18 further comprising means for establishing an object oriented environment in said host computer; and wherein said object references other objects; and said proxy program, when executed in said target computer, converts said other objects as well as the first said object to said first form usable by said target computer.

22. A method for assisting a first computer obtain an object, said first computer being coupled to a second computer, said method comprising the steps of:

storing said object in said second computer;

after the storing step and in response to a need for said object at said first computer, transferring a proxy program from said second computer to said first computer, said proxy program when executed in said first computer, generating said object, said proxy program being transferred from said second computer to said first computer instead of said object even though said object is stored in said second computer.

23. A method as set forth in claim 22 wherein said object comprises data and said data is larger than said proxy program.

24. A method as set forth in claim 22 wherein said second computer generates said proxy program from a template stored in said second computer.

25. A method as set forth in claim 22 wherein said first computer makes a request to said second computer for said object to indicate said need for said object, and said second computer receives said request.

26. A method for assisting a first computer obtain an object, said first computer being coupled to a second computer, said method comprising the steps of:

storing said object and a proxy program in said second computer, said proxy program when executed in said first computer, generating said object;

in said second computer, comparing a size of said object to a predetermined threshold;

after the storing of said object in said second computer, and in response to a request by said first computer for said object, if said size is greater than said threshold, transferring said proxy program instead of any substantive form of said object from said second computer to said first computer, and if said size is less than said threshold, transferring said object instead of said proxy program to said first computer.

27. A computer program product for execution in a host computer to assist a target computer obtain an object, said host computer storing said object and a proxy program, said computer program product comprising:

a computer readable medium;

first program instruction means for instructing a processor to respond to a need for said object at said target computer, by transferring said proxy program to said target computer, said proxy program when executed at said target computer generating said object at said target computer, said proxy program being transferred from said host computer to said target computer instead of any substantive form of said object even though said object is stored in said host computer; and wherein said first program instruction means is recorded on said medium.

* * * * *